United States Patent Office 3,337,759
Patented Aug. 22, 1967

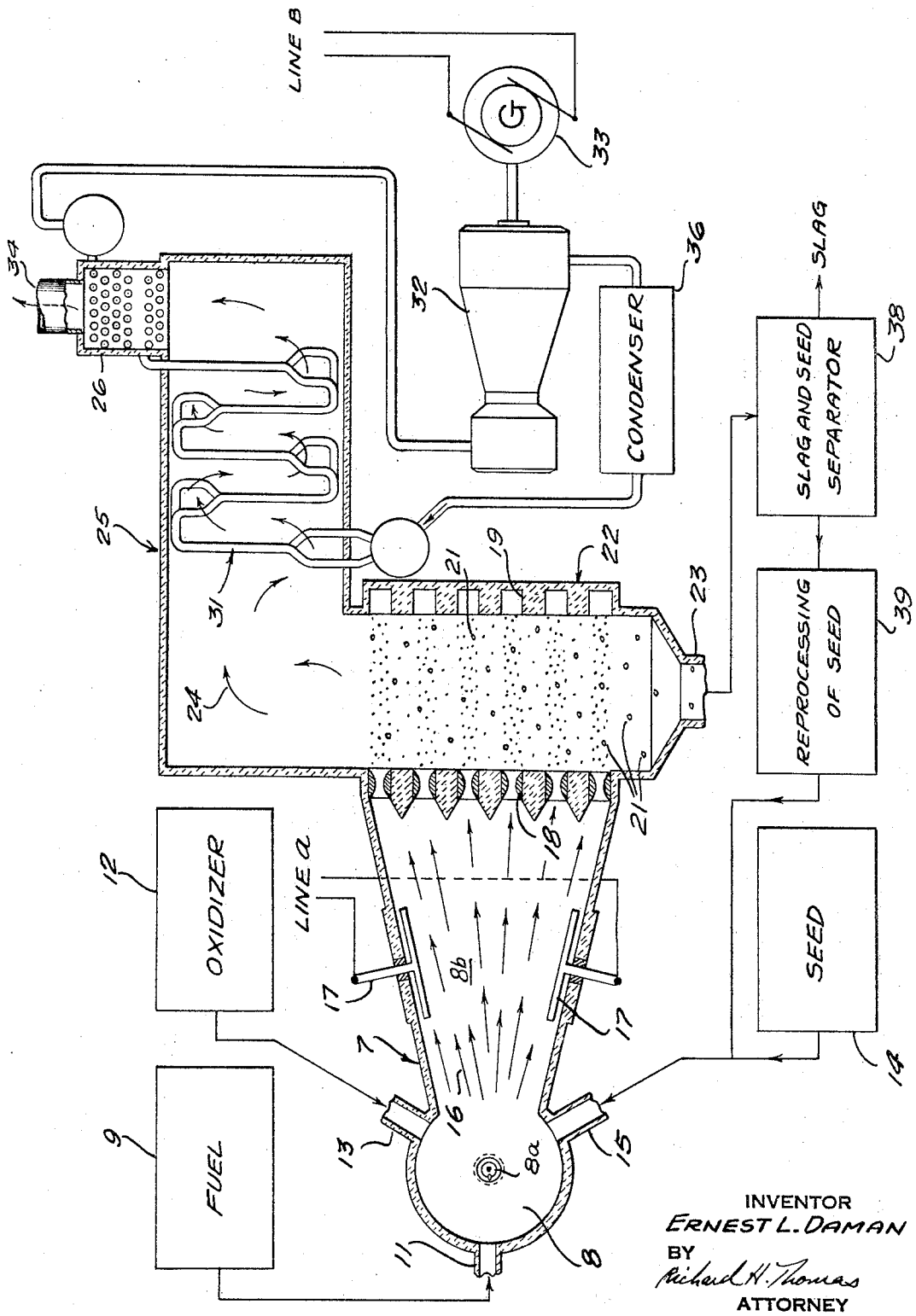

3,337,759
**AGGLOMERATION IN MAGNETOHYDRO-
DYNAMIC CYCLE**
Ernest L. Daman, Westfield, N.J., assignor to Foster
Wheeler Corporation, New York, N.Y., a corporation
of New York
Filed June 1, 1964, Ser. No. 371,295
5 Claims. (Cl. 310—11)

ABSTRACT OF THE DISCLOSURE

The removal of seed material from ionized pressurized gases in which a jet-type agglomerator is utilized having a series of aligned horizontal nozzles and cup formations. Standing waves are set up whereby the seed material is agglomerated into larger particles for gravitational removal.

Magnetohydrodynamic (hereinafter referred to as MHD) energy conversion is well known as a means for the generation of electricity without resort to the turbine-generator combination. In an MHD generator superheated ionized gases substitute for a conventional armature, and pass through a magnetic field to generate electric current. Although MHD electric generation has been known for some time and is particularly advantageous for specialized uses such as space propulsion and re-entry, several obstacles stand in the way of making MHD an economic substitute for present methods of power generation.

In an MHD generator, it is desirable to introduce a seed material, such as an alkali metal, into the gas to increase the ability of the gas to ionize at lower temperatures. Economic considerations require the recovery, reprocessing and reuse of the seed material in the MHD generator. Furthermore, where a boiler-turbine combination is added to an MHD generator to recover secondary heat and produce secondary electric generation, it is desirable to remove the slag formed by fossil fuel combustion. The ordinary methods for slag removal require large cooling surfaces and costly plant and boiler equipment and are not especially adapted for removal of seed in an MHD generator.

Therefore, it is an object of the present invention to provide a method and apparatus for the removal of seed material in an MHD generator.

It is also an object of the present invention to provide a method and apparatus for the removal of seed and slag material in an MHD boiler-turbine combination.

According to the present invention, the removal of seed and slag material is accomplished by the agglomeration of seed and slag particles by sonic whistle formations which are especially advantageous for the utilization of the high pressures that are available in MHD power generation systems. Sonic whistle formations consist of a series of corresponding spaced nozzles and cups which define a chamber therebetween. Standing waves of particular frequencies are set up in the chamber between the nozzles and cups by passing high pressure gases through the nozzles. This causes particles which may be suspended within the gases to agglomerate at nodes into particle sizes of sufficient mass for gravitation downward and out of the gas. An opening may be provided on the bottom of the chamber so that the gravitating particles may be collected for reprocessing.

The above and other advantages will appear more fully from the accompanying drawings and description.

The drawing shows an MHD boiler-turbine combination consisting of an MHD generator 7, a sonic agglomeration chamber 22 and a boiler-turbine combination 25 and 32 for the boiler-turbine respectively. The MHD generator 7 is integrally formed with a combustion chamber 8 and an expansion chamber 8b which has a pair of electrodes 17. Fuel 9 ordinarily consisting of hydrocarbon fuels enters the combustion chamber 8 through nozzle 11 and oxygen 12 enters through 13. Seed material 14 commonly consisting of potassium, or in general, elements with a low ionization potential such as those of the alkali group, is injected into the mixture through openings 15. The hot gases required for the MHD generator are produced by burning the seeded fuel and oxygen mixture. An ignitor generally indicated at 8a is used initially during lightup to ignite the mixture. Combustion of the fuel oxygen mixture produces highly pressurized hot gases which readily become ionized due to the presence of the seed material. Ionized gases 16 then pass through the MHD generator 7 and through a magnetic field therein (not shown) located perpendicular to the generator electrodes 17, causing electricity to be produced in line a. Further details on MHD power generation can be obtained in a report (among others) "Experiments with MHD Power Generation," American Society of Mechanical Engineers, Paper No. 60–WA–328, presented Nov. 27–Dec. 2, 1960.

In general, an MHD generator by necessity has to be run at a considerably higher pressure than a conventional combustion system. For instance, a conventional boiler may have a furnace pressure of about one atmosphere, whereas an MHD generator using a 1600° F. $O_2$ and air mixture in the ratio of $2N2/O_2$ by weight, will require a pressure in the combustion chamber of at least 16 atmospheres. In passing through the magnetic field, the gas will expand to about 1.05 atmospheres for a drop of about 15 atmospheres. Under different conditions, much higher pressures are required or can be tolerated in the MHD generator, for instance, in the order of 25 atmospheres in the combustion chamber.

As a further aspect of the MHD generator, a large amount of seed material is required. For instance, in the above example, about 3000 lbs./hr. of seed material would be injected for a total fuel input of about 215,000 lbs./hr.

Following expansion in the expansion chamber 8b of generator 7, the pressurized gases leave the generator and pass through a series of nozzle constrictions 18 built into the system, each associated with a horizontally disposed cup 19 so as to cause the gases to jet through the constrictions and set up standing waves of particular frequencies and intensity. This type of a unit is frequently referred to as a jet-type or "Hartman" ultrasonic vibrator or wave generator. The standing waves cause the slag from fuels such as coal and heavy oil and seed particles which are suspended in the gases to agglomerate into particles of increasing mass 21 which begin to gravitate downward as the force of gravity acting on them becomes sufficient to overcome the buoyancy forces of the gases. The gravitating masses leave the agglomeration chamber 22 through an opening 23 on the bottom. It is preferable to then pass the gravitating masses into a separator 38 for the removal of slag and seed and then into a reprocessing unit 39 for reprocessing the seed which is directed into opening 15. Further details on ultrasonic agglomeration are set forth in an article, "Intensities Produced by Jet-Type Ultrasonic Vibrators," volume 25, No. 3, September 1953, "The Journal of the Acoustical Society of America."

This process substantially frees the gases of seed and slag. The cleansed gases, as shown at 24, pass through heat recovery zones 25 and 26 converting water passing through tubes 31 from condenser 36 to steam. The steam drives turbine 32 thereby providing a secondary electrical power output through line B from generator 33. Conventional heat recovery systems well known in the art, for instance, that shown in the Hardgrove Patent No. 2,713,853 can be used in the zones 25 and 26. The gases are passed out of the system through stack 34. The factors which govern the agglomeration process are frequency and amplitude of the vibrations as well as pressure drop across the nozzles and the geometry of the nozzles and cups.

In this respect, the pressure drop is a critical factor in obtaining the degree of agglomeration required for removal of molten ash and seed from the gas flow.

It is believed unnecessary to go into specific details with respect to dimensions, sizing and disposition of nozzles and cups, and other variables of the ultrasonic agglomeration means, since in any particular case, these are a matter of experimentation. However, it should be noted that a pressure drop of at least one atmosphere and in the range of from one to three atmospheres generally will probably be required to achieve the intensity (frequency×amplitude) necessary for agglomeration.

A typical example may require a pressure drop of 1.45 atmospheres.

It was found, surprisingly, in accordance with the invention that the combustion chamber pressure and magnetic field pressure drop required in the MHD generator very advantageously can provide or result in the upstream nozzle pressure required for agglomeration. For instance, gas in the combustion chamber at 18 atmospheres will expand to about 3.5 atmospheres. A requirement of about one atmosphere upstream of the heat recovery surfaces allows for a pressure drop of 2.5 atmospheres across the nozzles 18.

With respect to temperatures, there is usually a negligible temperature change across the nozzle constrictions. The MHD unit requires a certain temperature level for the gas to be conductive for instance, above 2800° K. This temperature is found to be very suitable for agglomeration and in fact, is sufficiently high that all ash and seed is in a molten state, actually requiring removal prior to passage through heat recovery surfaces. In a molten state, the particles will deposit on the cooling surfaces in the heat recovery zone and will result in corrosion and fouling of the surfaces.

Further advantages of the invention should now be apparent. By virtue of the combination of a means for agglomeration with the components including the MHD generator and the boiler, the gases passing to the boiler are slag free advantageously eliminating the need for costly slag removal equipment therein and maintaining clean boiler internals.

Also, it was mentioned above that a large amount of seed material is required in an MHD unit. An alkali seed is expensive. The present invention in providing a seed removal and recovery system especially adaptable for use with an MHD generator provides an obvious economic advantage.

In an embodiment of the invention, a gas turbine may be disposed at the outlet end 34 of the unit, to utilize further energy in the gases. Use of a gas turbine requires an extremely clean flow, and it can be seen that the concepts of the invention can very advantageously be applied to the combining of a gas turbine with the other components of the system. In particular, the agglomeration chamber removes the seed and ash so that only a clean gas flow passes to the heat recovery surfaces and to the turbine. With respect to pressures, approximately six atmospheres pressure may be required upstream of the turbine exhausting to further heat recovery surface at about 1.05 atmospheres. Working back through the unit, with approximately three atmospheres drop across the nozzle constrictions of the agglomeration means, there will be nine atmospheres at the outlet end of the MHD generator. With a pressure drop in the generator of about 14 atmospheres, the combustion chamber will have a pressure of approximately 25 atmospheres, which is within the optimum pressure range for the generator.

Although the invention has been described with reference to specific embodiments, many variations within the spirit and scope of the following claims will be apparent to those skilled in the art.

What is claimed is:

1. An MHD generator system for removing seed material in ionized pressurized gases, comprising:
   - an MHD generator having a combustion chamber and an expansion chamber, the latter including at least two opposed electrode plates, the passage of ionized gases past the electrode plates generating electricity,
   - means for injecting a fuel and oxygen supply to the generator combustion chamber, means for supplying seed material to the fuel in the combustion chamber,
   - means for igniting the fuel and oxygen mixture in the combustion chamber to create ionized pressurized gases expanding in the expansion chamber,
   - a jet-type agglomerator having a series of nozzle constrictions in fluid communication with the expansion chamber,
   - the agglomerator including a series of cup formations, each cup in spaced relationship associated with a nozzle for causing the gases to jet through the nozzles and set up standing waves, the waves causing the seed material to agglomerate into particles of sufficient size for gravitation,
   - said associated nozzle and cup axially aligned in a substantially horizontal direction so that the agglomerated particles gravitate in a perpendicular downward direction therefrom,
   - the agglomerator further having an upper outlet for the flow of gases therefrom.

2. An MHD generator system according to claim 1
   - wherein the fuel injected into the generator is a slag forming fuel, the temperatures in the generator and agglomerator being such that the slag and seed are in a molten state, the agglomerated particles comprising both seed and slag,
   - further comprising means for collecting and processing the particles so that the seed is separated from the slag, and
   - means for recycling the separated seed to the generator.

3. An MHD generator system according to claim 2, further comprising:
   - boiler means of the water tube type in communication with the agglomerator for receiving gases passing through the agglomerator,
   - the agglomerator formed with a lower opening so that the agglomerated slag and seed particles pass out of the agglomerator.

4. A method for the agglomeration of ash and seed particles in a magnetohydrodynamic power generation cycle comprising the steps of:
   - supplying a mixture of fuel, oxidizer and ionization promoting seed material to a magnetohydrodynamic generator;
   - passing said mixture through a magnetic field;
   - igniting said mixture to produce pressurized and ionized gases;
   - passing said gases through an agglomerator having a series of axially aligned horizontal nozzle restrictions in spaced relation with a series of cup formations such that standing waves are set up whereby said seed material is agglomerated into particles of sufficient size for gravitational movement in a downward direction; and
   - passing the gas from which said particles have been removed out of said agglomerator.

5. A method according to claim 4 including collecting the agglomerated seed particles; and
   - recycling the collected seed particles to said generator for mixing with said mixture.

(References on following page)

References Cited

UNITED STATES PATENTS

| | | | |
|---|---|---|---|
| 2,609,063 | 9/1952 | Francis | 55—15 |
| 3,214,616 | 10/1965 | Way et al. | 310—11 |
| 3,223,860 | 12/1965 | Brill | 310—11 |

OTHER REFERENCES

Chemical Engineering, Oct. 2, 1961; pp. 85, 86, 91 and 92.

MILTON O. HIRSHFIELD, *Primary Examiner.*

DAVID X. SLINEY, *Assistant Examiner.*